March 7, 1950 T. HOTCHKISS, SR 2,499,750
AUTOMATIC COUPLER FOR TRAILERS
Filed Aug. 8, 1946

INVENTOR:
THOMAS HOTCHKISS, SR.
BY Alfred F. Dees
ATTORNEY

Patented Mar. 7, 1950

2,499,750

UNITED STATES PATENT OFFICE 2,499,750

AUTOMATIC COUPLER FOR TRAILERS

Thomas Hotchkiss, Sr., St. Louis, Mo.

Application August 8, 1946, Serial No. 689,308

4 Claims. (Cl. 280—33.15)

This invention relates to couplers to connect a self-propelled vehicle with a trailer and in its more specific aspects is directed to a construction thereof which will automatically engage and lock.

The object of this invention is to produce a coupler whose component parts, when properly installed and aligned, will automatically interlock to produce a strong and durable connection and whose parts, when coming into engagement with each other, will so manipulate the latch thereof as to first clear it from the path of movement of the connecting member and later cause it to be securely locked in position.

Figure 4:
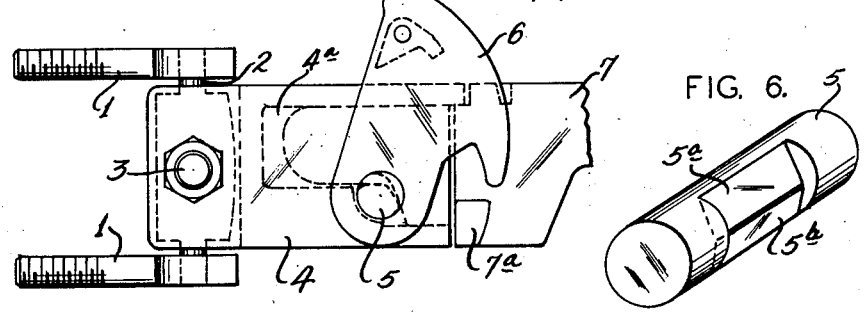
Fig. 4 is a view similar to Fig. 3 but with the coupler heads in position just before latching.
Figure 6:
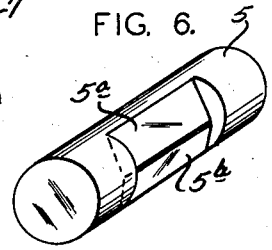
Fig. 6 is a perspective view of the coupler head cam shaft.

Referring now to the drawings, numerals 1,1 designate two spaced elements of a female coupler member which extend through an appropriate member on a propelling vehicle to secure the coupler member thereto. Numeral 2 designates a member disposed between elements 1,1 for pivotal movement in a horizontal plane and having flat bearing surfaces on opposite sides thereof. The housing 4 of the female coupler member is provided with jaws adapted to cooperate with the bearing surfaces of said member. A pin 3 extends through said jaws and member 2 to enable said housing to pivot in a vertical plane. A shaft 5 is rotatably mounted in housing 4 and this shaft has a cam surface 5a formed thereon which, as viewed in Figure 4, shows one cam surface extending generally horizontally which blends with a generally vertical cam surface 5b. Secured to shaft 5 and arranged exteriorly of housing 4 are latch members 6,6 constructed and shaped according to the illustrations in Figures 2-5.

The male element 7 of the coupling is a longitudinally disposed member having a head at the left hand end thereof whose extreme end surface 7d is formed at right angles to the longitudinal axis of member 7 and blends with a curved surface 7c. The surface 7c blends into a surface parallel to said axis and extends to the right until intersected by one of the surfaces of indentation 7b which is cut into the male member. The right hand side of the indentation 7b is a surface extending at substantially right angles to said axis and extends downwardly until it intersects a surface parallel to said axis extending from the right hand or shank portion of the member 7. The indentation 7b is intended to receive the cam portion 5a of spindle 5 when the coupler heads are in engagement with each other.

Figure 1:
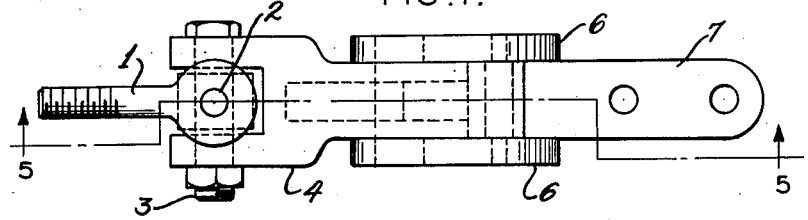
Fig. 1 is a plan view of the improved assembled coupler.
Figure 2:
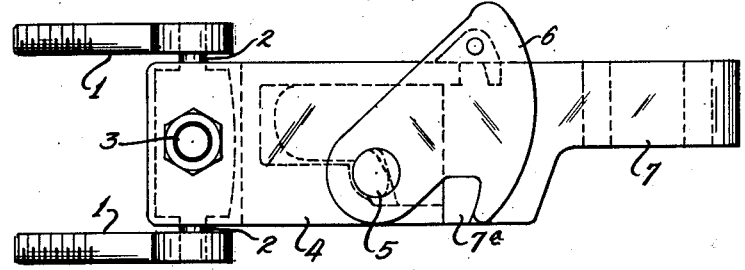
Fig. 2 is a side elevational view of the assembled coupler.
Figure 3:
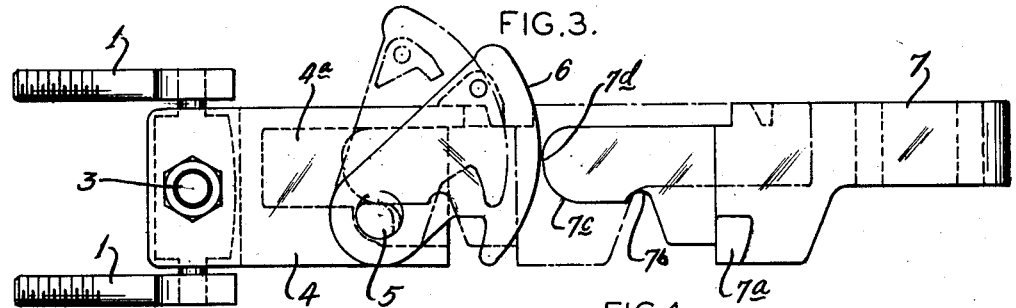
Fig. 3 is a view of the coupler with the heads in disassembled relation.
Figure 5:
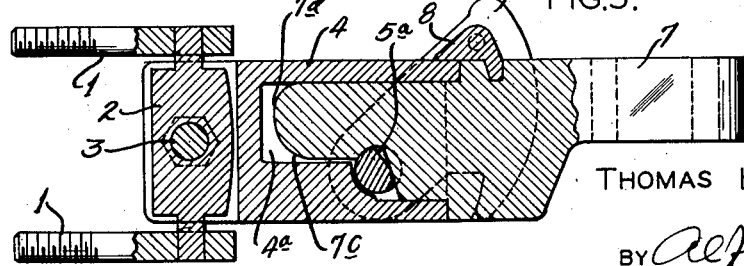
Fig. 5 is a section view taken substantially along the line 5—5 of Fig. 1.

Member 7 is provided with a pair of abutments 7a, only one of which is shown, disposed on opposite sides thereof and positioned as shown. Latch members 6,6 have hooks formed on one side thereof contoured to the shape of abutments 7a, which hooks engage the abutment 7a, as shown in Figures 2 and 5, when the coupler members are in engagement. 8 is a lock to hold the coupler heads in assembled relation after latching.

Referring now to the operation of the device, as the coupler members are brought into engagement, the left hand extension or head of the male member will enter the socket 4a in housing 4. The surface 7c will engage the generally horizontal cam surface on the spindle 5a to rotate the spindle in a counter-clockwise direction to bring the hooks on the latch members 6,6 to the elevated position shown in Figure 4 such that the points of the hooks will clear the abutment 7a. They will be held in this position until the hooks extend past the abutment or as long as said generally horizontal cam surface is engaged by the surface parallel to the longitudinal axis of member 7 which blends with surface 7c. When the male member has progressed a sufficient distance into socket 4a so that the hooks have cleared abutments 7a, the generally vertical portion of the cam surface 5a will be engaged by the substantially vertical surface of the indentation 7b to rotate the latches 6,6 in a clockwise direction to cause them to assume the position illustrated in Figures 2 and 5 or about the abutment 7a. When it is desired to disengage the coupling, latch members 6,6 are manually rotated in a counter-clockwise direction to substantially the position shown in Figure 4 whereupon the coupler members may be separated.

Having fully described my invention, that which I claim as novel and desire to protect by Letters Patent of the United States is:

1. A coupler comprising a first and a second member adapted for interengagement; a cam shaft rotatably mounted in said first member; abutment means on said second member; latching means on said shaft engageable with said abutment means; a surface on said second member to rotate said cam shaft counter-clockwise to permit said members to interengage; and a second surface on said second member to rotate said cam shaft clockwise after interengagement of said members to engage said latching means and said abutments.

2. A coupler comprising a male member having abutments thereon; a female member; a shaft having a cam formed thereon and rotatably mounted in said female member; latch means secured to said shaft and engageable with said abutments; a first surface on said male member engageable with said cam to rotate said shaft counter-clockwise to enable said male coupler member to enter said female member; and a second surface on said male member engageable with said cam surface to rotate said shaft clockwise after said coupler members are brought into engagement with each other to cause said latches to engage said abutments.

3. A coupler comprising a male member having abutments thereon; a female member; a shaft having two angularly disposed cam surfaces thereon and rotatably supported in said female member; latch members on said shaft having hooks thereon engageable with said abutments; and said male member having a first surface thereon engageable with a first cam surface to rotate said latch member counter-clockwise to enable said hooks on said latch members to clear said abutments and a second surface on said male member engageable with the second of said cam surfaces to rotate said latch members clockwise to enable the hooks thereon to engage said abutments.

4. A coupler comprising a first and a second member adapted for interengagement; a shaft having two cam surfaces thereon and rotatably mounted in said first member; latching means mounted on said shaft to hold said members in engagement with each other; cam means formed on said second member engageable with one of the shaft cam surfaces to actuate said latching means to permit interengagement of said members; and other cam means formed on said second member engageable with the other shaft cam surface to actuate said latching means to lock said members after interengagement.

THOMAS HOTCHKISS, SR.

REFERENCES CITED

The following references are of record in the file of this patent:

UNITED STATES PATENTS

| Number | Name | Date |
|---|---|---|
| 854,196 | Brown | May 21, 1907 |
| 1,240,818 | Buller | Sept. 25, 1917 |
| 1,319,224 | Keesler et al. | Oct. 21, 1919 |
| 1,333,384 | Buller | Mar. 9, 1920 |
| 1,610,902 | Tomlinson | Dec. 14, 1926 |